July 14, 1970
W. T. RENTSCHLER
3,520,239
PHOTOGRAPHIC SHUTTER WITH AN ELECTRONIC TIMING DEVICE
Filed Oct. 10, 1966
2 Sheets-Sheet 1
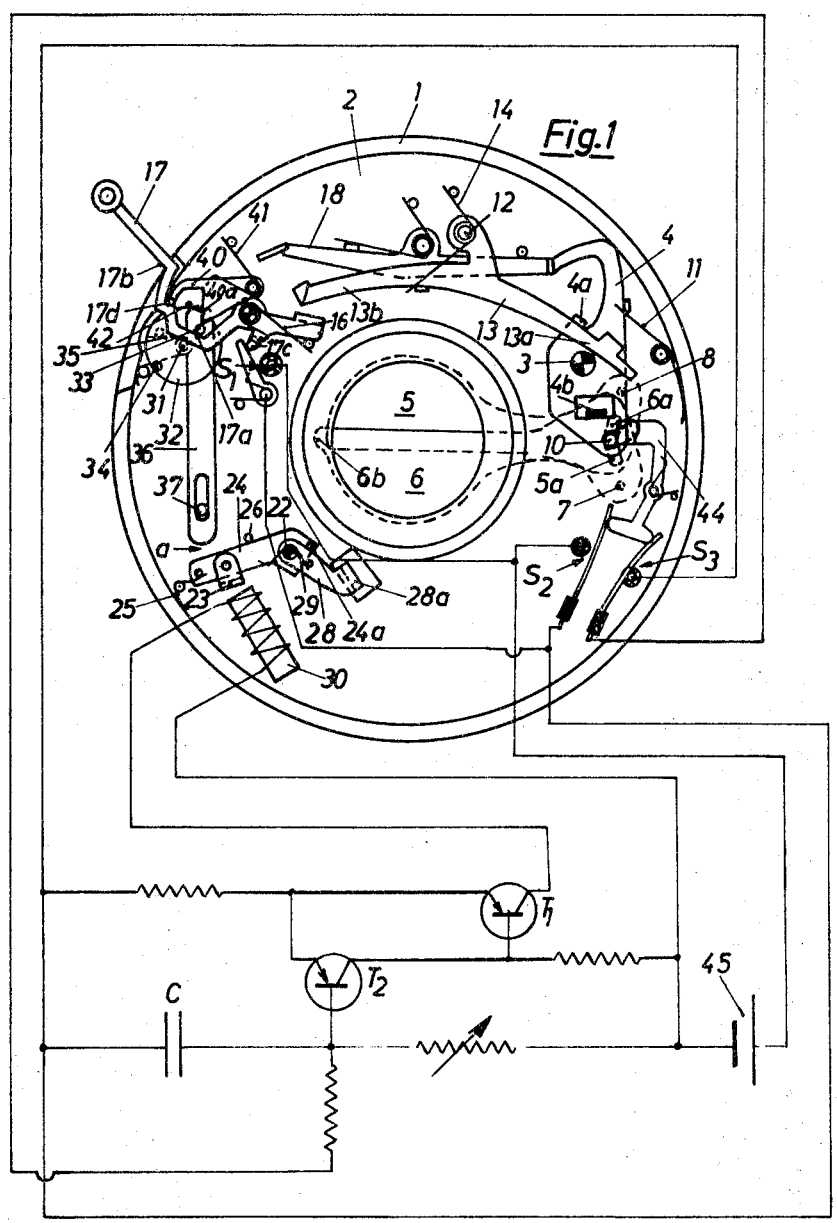
INVENTOR
WALDEMAR T. RENTSCHLER
BY *Arthur A. March*
ATTORNEY

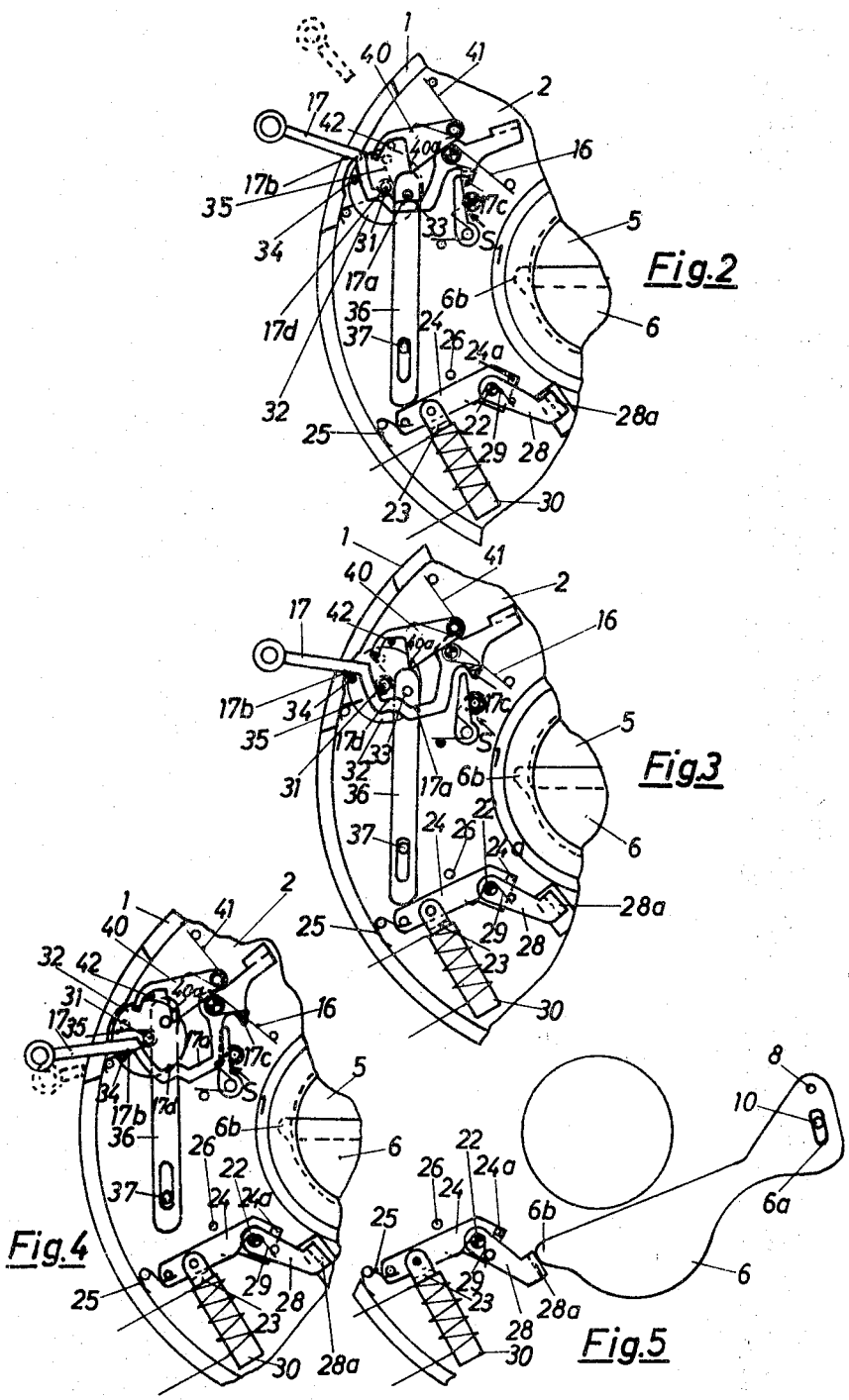

United States Patent Office 3,520,239
Patented July 14, 1970

3,520,239
**PHOTOGRAPHIC SHUTTER WITH AN
ELECTRONIC TIMING DEVICE**
Waldemar T. Rentschler, Calmbach, Black Forest, Germany, assignor to Prontor-Werk Alfred Gauthier, G.m.b.H., Calmbach, Black Forest, Germany, a German corporation
Filed Oct. 10, 1966, Ser. No. 585,695
Claims priority, application Germany, Oct. 28, 1965,
P 37,984
Int. Cl. G03b 9/00
U.S. Cl. 95—53                                4 Claims

ABSTRACT OF THE DISCLOSURE

A photographic shutter with an electronic timing device is provided having at least one pivotally mounted shutter blade and a detent for holding the shutter in the open position. The electronic timing device sets the exposure time and has an electro-magnet for engaging the detent, the detent being engageable by the electro-magnet for holding the shutter in the open position for the duration of the exposure. The shutter blade is engageable directly by the detent at a point spaced from the pivotal point of the shutter blade to hold the shutter blade in the open position.

---

The present invention relates to a photographic shutter with an electronic timing device for setting exposure time, and more particularly, to a photographic shutter, with at least one shutter blade, having an electronic timing device which comprises an electro-magnet acting upon a detent to keep the shutter blades in the open position for the duration of the exposure.

Various designs of open time detents are known for shutters with electronic devices for setting exposure time. Such detents are understood to be devices which keep the shutter in the open position under the influence of an electro-magnet until an electronic circuit connected to the electro-magnet gives a command to close the shutter.

Open time detents that are known can be divided into two categories, namely those in which the armature, belonging to the magnet, is disposed at a shutter blade where the magnet keeps the shutter blade in the open position against the effect of a closing spring influencing the blade. Among the second category are detents in which a movable part of the shutter drive is arrested in a position corresponding to the open position of the shutter blades.

Although it is noted that the first mentioned kind of detent system makes a virtually steady transition from completely unhindered shutter action to the action with the least possible amount of electronic braking achievable, thus at the same time avoiding a jumping point in the exposure time control, this known arrangement, nevertheless, has the draw-back that a relatively strong and, hence, large, space consuming electro-magnet is required to hold the shutter blade safely against the effect of its closing spring. In attempting to eliminate this draw-back by making the electro-magnet smaller, there is only one solution, namely to make the closing spring of the shutter blade weaker. However, relatively short exposure times will then be no longer achieved. In addition, weak drive springs have a closing characteristic with a flat curve which has a non-favorable influence on the quality of the shutter. Moreover, the mass of the magnetic armature which must be moved by the shutter blade has an equally unfavorable effect.

Deviating from the arrangement described before, a jumping point during the transition from the completely unhindered shutter action to the action corresponding to the first stage of electronic braking is hardly avoidable in the detents of the aforementioned second category because the part blocking the shutter drive must travel a certain distance before it disengages from the arrested driving part. Also, space requirements for the accommodation of the electro-magnet, and the detents controlled by it are stringent insofar as the magnet, due to its function, must be accommodated precisely in that area in which the shutter driving part is disposed.

It is an object of this invention to avoid the deficiencies of the known arrangements, and to create a locking device to lock the shutter drive in the open position of the shutter blades, which is applicable to various shutter types due to the ready adaptability to the given space conditions while keeping the structural design relatively simple, whereby the release of the shutter drive in the open position of the shutter blades may be accomplished as free of retardation as possible.

This problem is solved according to this invention essentially in that the detent engages one of the shutter blades directly and that the detent arrests the shutter blade at a point far removed from the pivotal point of the said blade. This creates for the photographic shutter the conditions which guarantee freedom of movement for the detent arrangement holding the shutter blade system in the open position. Beyond this, it is possible to restrict the space requirements for the accommodation of the detent in the shutter housing to a minimum because the holding force arresting the shutter blade can be reduced in inverse ratio to the achieved length of its lever arm, which is equivalent to guaranteeing proper function of the timing device even when weak magnets are used.

To assure reliable operation of the shutter, i.e., to succeed in having the detent always engage the respective shutter blade at the correct instant, a further feature of the invention provides for a device which cooperates with the detent and is affected by the winding or releasing mechanism of the shutter and which, depending on the actuation of the winding or releasing mechanism, transfers the detent automatically into the locked position and subsequently returns automatically into the starting position.

In reference to the design of the device for forcing the detent into the locked position, it may in an advantageous embodiment of the invention, comprise a spring loaded switching disk to which two drive pins are fastened at either side of the axis of rotation, so as to oppose each other diametrically. A lever is also provided in such an embodiment having two driving edges formed thereon serving to actuate the release mechanism, and which cooperate successively and respectively with one of the two drive pins in such a manner that the switching disk, moving first in the one and then in the other rotational direction, acts directly or indirectly upon the detent.

To further increase the possibilities of arranging the detent within the shutter housing, another aspect of the invention provides for a push rod, linked eccentrically to the disk at one end and guided at the other end, to connect the switching disk effectively with the detent.

For the perfection of the device cooperating with both the winding or releasing mechanism of the shutter and the detent, it is of advantage to assuring reliable operation of the shutter at any exposure time, to provide a lock pawl for the switching disk which fixes the disk after its return into the starting position.

In a photographic shutter with at least one shutter blade and an electronic timing device to set exposure time comprising an electro-magnet acting upon a detent holding the shutter blades in open position for the duration of the exposure, a preferred design of this detent can be achieved according to another aspect of the invention, wherein the detent, engaging one of the shutter blades, is designed as a friction lock. This creates the conditions for achieving a steady transition from the exposure time corresponding to the unhindered shutter action to the shortest exposure time achievable with the electronic timing device. This follows from the fact that virtually simultaneously with the command to release the detent given by the electronic timing device, the shutter blade also moves because, in order ot release it for changing over into the closed position, no engaging distance has to be traveled by a locking lever and, consequently, no time is used for this purpose.

In stopping the shutter blade in the open position, in order to avoid shock loads on the detent as well as on the shutter blade itself, it is expedient according to the invention to design the part of the detent engaging the shutter blade to be springy and resilient. This dampens the shock of the shutter blade striking the detent part in the open position so that tearing of the detent away from the electro-magnet is avoided. Moreover, the resilient design can serve to compensate for assembly and manufacturing tolerances. Another possibility for avoiding shock loads is provided by a detent having a pawl which is resiliently supported by it for engagement with the shutter blade.

Various other objects, features and advantages of this invention will be apparent from the following specification, claims and the drawings appended hereto wherein:

FIG. 1 is a view of a self-winding shutter together with a schematic representation of an electronic timing device, with the shutter in the initial position, FIG. 2 is a fragmentary view similar to FIG. 1 wherein the winding and releasing lever as well as the open time detent actuated by it are in an intermediate position of the winding process, FIG. 3 is a view similar to FIG. 2 with the parts in a subsequent intermediate position of the winding process, FIG. 4 is a view similar to FIG. 3 with the parts in a subsequent intermediate position of the winding process, FIG. 5 is a partial view, restricted to the representation of one shutter blade and the detent, illustrating the shutter in open position of the shutter blade.

Referring now to the drawings there is disclosed a shutter housing 1 of a photographic shutter, for example, one designed as a self-winding shuter. A shutter base 2 is arranged in a known manner and serves to receive the components of the shutter mechanism. A shutter blade actuating lever 4 is mounted on the base plate 2 by means of a pin 3, and cooperates with two shutter blades 5 and 6 disposed at the back side of the base plate 2 for the purpose of transferring them into the open and closed position. The two shutter blades 5 and 6 are mounted on stationary pins 7 and 8, respectively, and are provided with slots 5a and 6a, respectively, both of which are engaged by a drive pin 10 of the shutter blade actuating lever 4. In the starting or at rest position of the shutter, the lever 4 under the force of a spring 11, assumes the position shown in FIG. 1 illustrating the closed position of the shutter blades 5 and 6. A counter clockwise rotation of the shutter blade actuating lever 4 results in a changeover of the shutter blades 5 and 6 into their open position by pivoting about their mounting pins 7 and 8.

In order to drive the shutter blade actuating lever 4, a a driving lever 13, pivotally mounted on a pin 12, is provided with an arm 13a which under the influence of a driving spring 14, makes contact with a tab 4a of the shutter blade actuating lever 4 in the starting position of the shutter. An arm 13b of the driving lever 13 provides a connection to a pivotally mounted winding and releasing lever 17 which is loaded by a return spring 16 and, in addition, serves to actuate a locking lever 18 securing the lever 4 in the closed position.

In detail, the arrangement of the locking lever 18 is such that upon depressing the winding and releasing lever 17, the driving lever 13 is first turned in a clockwise direction, whereby its arm 13a slides across a bevelled driving tab 4b until the lever 13 of the shuter blade actuating lever 4, drops into place behind the tab 4b. After the winding and releasing lever 17 has moved away from the driving lever 13, the shutter still remains in the closed position, however, because the locking lever 18 prevents the run-off motion of the shutter blade actuating lever 4. Only after the winding and releasing lever 17, during the further course of the winding motion, has disengaged the locking lever 18 from the shutter blade actuating lever 4 by a clockwise rotation, can the driving lever 13 transfer the shutter blades 5 and 6 into the open position.

As may be seen further from FIG. 1, the shutter arrangement described above is provided with a detent, controlled by an electric timing device, by means of which the shutter blades 5 and 6 are held in the open position in accordance with the preselected exposure time. Expediently, the detent directly engages one of the shutter blades, such as the shutter blade 6, whereby due to the driving connection, the shutter blade 5 is also held in the open position. A point on the shutter blade 6, far removed from the pivot point formed by the mounting pin 8 is advantageously selected as the engaging point of the detent so that the transmission ratio between the shutter drive and the engaging point of the detent is utilized. Accordingly, the detent only has to provide a relatively small counter force to keep the shutter blades in the open position.

In detail, the detent may consist of a dual arm lever, mounted on a stationary pin 22 and carrying at one end a magnetic armature 23 while at its other end it carries suitable means to engage and hold the shutter blade 6 in the open position. In the illustrated embodiment, this locking lever is of a two-part design consisting of a lever 24, carrying the pivotally mounted armature 23, which lever is biased by a spring 25 to make contact with a stop pin 26. Pivotally mounted on the same pin 22 with the lever 24 is a pawl 28 which, in the starting position of the shutter, supports itself against a tab 24a of the lever 24 under the force of a spring 29. Cooperating with the armature 23 is an electric-magnet 30 controlled by the electronic timing device.

In the disclosed embodiment, the detent cooperating with the shutter blade 6 is preferably designed as a friction lock for releasing the shutter blade held by it substantially simultaneously with the command from the electronic switching device to release the detent. To engage and hold the shutter blade 6 in the open position, a tab 28a is bent away from the pawl 28 which, after the detent is transferred in to the locking position, is positioned in the range of motion of a protrusion 6b provided on the shutter blade. During the movement of the shutter blades 5 and 6 into the open position, the protrusion 6b contacts the surface of the tab 28a which faces the shutter blades and is thus engaged and held in the open position as long as the detent is kept in the locking position by the electric-magnet 30. In the area of its slot 6a, the shutter blade 6 cooperating with the detent can be reinforced in a known manner so as to reliably prevent its tearing out.

To transfer the detent into the locking position, whereby the armature 23 makes contact with the electric-magnet 30, the winding and releasing lever 17 cooperates with a device having a switching disk 32 which is rotatably mounted on a stationary pin 31. The switching disk 32 has two drive pins 33 and 34 fastened thereto so as to be on approximately diametrically opposite sides of the disk 32. In the starting or at rest position of the shutter under the influence of a spring 35, the pin 33 contacts a driving edge 17a of the winding and releasing lever 17 which is bent at several places so that an edge 17b of this lever can cooperate with the pin 34. The winding and releasing lever 17 is, moreover, provided with a finger 17c inclined downward from its lane of motion by means of which the main switch $S_1$ of the electronic timing device can be actuated. The drive pin 33 can at the same time serve as link pin for a push rod 36 which is guided at one end on a stationary pin 37 and, upon actuation of the winding and releasing lever 17, makes the locking lever 24 contact the electro-magnet 30 against the force of the spring 25. In the starting or at rest position of the shutter, there is a space *a* between the free end of the push rod 36 and the locking lever 24 which is provided to give faultless shutter operation in a manner to be described hereinafter.

In the basic position of the shutter, a lock pawl 40 is provided which is adapted to abut against an additional stop ege 17d of the winding and releasing lever 17. The lock pawl 40 serves to lock the push rod 36 in the starting position after the armature 23 has made contact with the electro-magnet 30. During the winding process, however, the lock pawl 40 follows the winding and releasing lever 17 under the influence of a spring 41 and finally rests against a stationary pin 42.

As may be further seen from FIG. 1, a switching lever 44, made of non-conductive material is provided for actuating a contact switch $S_2$ connected in parallel to the main switch $S_1$, and for actuating a short circuit switch $S_3$. The switching lever 44 is biased into contact with the drive pin 10 in engagement with the two shutter blades 5 and 6. In detail, the arrangement is such that, in the initial position shown in FIG. 1, the switch $S_2$ is open, but the switch $S_3$ is closed. When the shutter blades 5 and 6 change into the open position, the switching lever 44 is turned clockwise by the pin 10, thereby closing switch $S_2$ while opening the switch $S_3$.

The previously mentioned electronic timing device, schematically illustrated in FIG. 1 outside of the shutter housing, is constructed in a known manner and comprises essentially two transistors $T_1$ and $T_2$, a capacitor C and a variable resistor R. The transistor $T_1$ and electro-magnet 30 are in series with two switches $S_1$ and $S_2$ as well as with the power source 45. The short circuit switch $S_3$ and the capacitor C connected with the second transistor $T_2$ as well as with the variable resistor R form a separate circuit.

The operating mode of the shutter arrangement described above is as follows:

In the initial rest position of the shutter, both the winding and releasing lever 17 and the open time detent formed by locking lever 24 and pawl 28 assume the position illustrated in FIG. 1, whereby the main switch $S_1$ as well as the parallel switch $S_2$ are open, but the short-circuit switch $S_3$ is closed. When depressing the winding and releasing lever 17, the switching disk 32, biased against the edge 17a, follows the winding and releasing lever, whereby the push rod 36 is moved towards the locking lever 24. Upon reaching the intermediate position shown in FIG. 2, the switching disk 32 has been rotated in a clockwise direction to a position where the armature 23, by means of the push rod 36, makes contact with the electron-magnet 30. In this position, the main switch $S_1$ is still open and, consequently, the electro-magnet 30 is currentless, so that the contact between the armature 23 and the electro-magnet 30 is established exclusively by the spring 35. At this point of the movement of the winding and releasing lever 17, the locking pawl 40, as may be seen from FIG. 2, contacts the stationary pin 42.

In the further courses of the winding motion, the switching disk 32 remains motionless due to the fact that the locking lever 24 is positioned against the stationary electro-magnet 30, whereas the main switch $S_1$ changes into the contact position shown in FIG. 3. This causes the transistor $T_1$ to conduct current and, consequently, the electro-magnet 30, receives current, whereas the transistor $T_2$ remains blocked. When moving from the initial position illustrated in FIG. 1 to the intermediate position illustrated in FIG. 3, the drive pin 34 and the winding and releasing lever 17 are brought into a position relative to each other so that the pin 34 abuts the edge 17b of the winding and releasing lever 17. In the further courses of the winding motion, the disk 32, therefore, is automatically moved back into the starting position, countering the force of the spring 35, whereby the push rod 36 moves away from the locking lever 24 which, in turn, is held in the locking position by the electro-magnet 30. During this return motion, the drive pin 33 strikes the locking pawl 40 and turns it clockwise a short distance. Thereafter, the locking edge 40a of the locking pawl 40 drops in behind the drive pin 33, the pawl contacts at the same time the stationary pin 42, so that the switching disk 32, including the push rod 36 linked to it, is locked in the position illustrated in FIG. 4, in which the push rod 36 is no longer able to exert an influence on the locking lever 24.

During the transition of the winding and releasing lever 17 from its initial position into the intermediate position illustrated in FIG. 4, the winding and releasing lever 17 has caused the drive lever 13 to engage and leave the drive tab 4b of the shutter blade actuating lever 4. However, the drive lever 13 cannot transfer the shutter blade actuating lever 4 into the open position because the latter is still secured by the locking lever 18. Released of the shutter takes place only upon moving the winding and releasing lever 17 into the release position illustrated in FIG. 4 by dotted lines, whereby locking lever 18 is swung away from the shutter blade actuating lever 4 so that the latter, rotating in a counterclockwise direction under the influence of the drive lever 13, can transfer the shutter blades 5 and 6 into the open position through drive pin 10.

During this opening motion, the switching lever 44 closes the parallel switch $S_2$, and opens the short circuit switch $S_3$, thus causing the capacitor C to start charging. When the shutter opening is free of the shutter blades 5 and 6, the protrusion 6b of the latter strikes against the tab 28a of the pawl 28 supported against the locking lever 24, thus interrupting the movement of the shutter blade 6 and holding it in the open position illustrated in FIG. 5, as long as the electro-magnet 30 is carrying current. Due to the resilient support of the pawl 28 with respect to the locking lever 24, the shock of the shutter blade striking against the tab 28a is reduced so that disengagement of the armature 23 from the electro-magnet 30 under current is avoided for all practical purposes.

As soon as the capacitor C of the electronic switching device reaches the base potential of the transistor $T_2$, the latter becomes effective while the transistor $T_1$ is suddenly blocked. This causes the electro-magnet 30 to be currentless, so that both the locking lever 24 and the pawl 28 are returned instantaneously to the starting position under the effect of the spring 25. At practically that same moment, the magnetic field collapses, the frictional adhesion between the pawl 28 and the shutter blade 6 is removed so that the shutter, under the effect of the spring 11, can return into the closed position. In this action, the parallel switch $S_2$ opens, whereas the short-circuit switch $C_3$ again closes.

By removing the load from the winding and releasing lever 17, the latter returns into the starting position under the influence of the return spring 16 whereby, towards the end of the return motion, the locking pawl 40 is moved clockwise by the winding and releasing lever 17 starting from the position illustrated in FIG. 4, the consequence of which is the unlocking of the drive pin 33. The switching disk 32 now turns clockwise by a few degrees until the drive pin 33 comes to rest against the edge 17a of the winding and releasing lever 17. This angular range is expediently smaller than the distance *a* from the end of the push rod 36 to the locking lever 24 to prevent a repeated actuation of this lever 24 into making contact with the electro-magnet 30, in case the locking lever 24 is returned into its starting position prior to removing the load from the winding and releasing lever 17. Therefore, the winding and releasing lever can also be let go of just at that moment, and returned into its starting position, in which the electro-magnet becomes currentless and the locking lever 24 moves back. Upon the return of the winding and releasing lever 17 into the starting position, the main switch $S_1$ is opened so that the electronic switching device is again disconnected from the battery 45.

It will be understood that the foregoing description with the details of exemplary structure is not to be construed in any way to limit the invention, but that modifications may be made thereto without departing from the scope of the invention as set forth in the following claims.

Having thus described the invention, I claim:

1. A photographic shutter with an electronic timing device comprising: at least one pivotally mounted shutter blade; a detent for holding the shutter in the open position; electronic timing means for setting exposure time having an electro-magnet for engaging said detent; said detent being engageable by said electro-magnet for holding the shutter in the open position for the duration of the exposure; and said shutter blade being engageable directly by said detent at a point spaced from the pivotal point of said shutter blade to hold the shutter in the open position and wherein said detent is transferred automatically into the locked position by switching means engageable with said detent, and wherein said switching means is operable by a winding and releasing means for said shutter, said switching means being automatically returnable into the starting position subsequent to positioning said detent in the locked position.

2. The photographic shutter of claim 1 wherein said switching means for positioning said detent into the locked position has a spring biased rotatable switching disk with two drive pins disposed on opposite sides of the axis of rotation thereof so as to oppose each other diametrically; and wherein said winding and releasing means has a lever for releasing said shutter, said lever having two driving edges which successively cooperate with one of said two drive pins so that said switching disk moves first in one and then in the other rotational direction for positioning said detent.

3. The photographic shutter of claim 2 wherein said switching means has a push rod eccentrically joined to said disk at one end and guided at its other end to connect said switching disk with said detent.

4. The photographic shutter of claim 2 wherein said disk is engaged by a lock pawl after said disk returns to the starting position for holding said disk in that position.

References Cited

UNITED STATES PATENTS

| | | | |
|---|---|---|---|
| 2,978,970 | 4/1961 | Fahlenberg | 95—53.3 XR |
| 3,208,365 | 9/1965 | Cooper. | |
| 3,230,853 | 1/1966 | Durst | 95—62 |
| 3,241,471 | 3/1966 | Burgarella | 95—55 |

NORTON ANSHER, Primary Examiner

L. H. McCORMICK, Jr., Assistant Examiner